United States Patent [19]

Wildeman

[11] E Re. 28,857

[45] Reissued June 15, 1976

[54] APPARATUS FOR PRODUCING STITCH BONDED FABRIC

[75] Inventor: Arno Edgar Wildeman, Altrincham, England

[73] Assignee: Cosmopolitan Textile Company, Ltd., Winsford, England

[22] Filed: Aug. 15, 1974

[21] Appl. No.: 497,732

Related U.S. Patent Documents

Reissue of:

[64] Patent No.: 3,760,607
Issued: Sept. 25, 1973
Appl. No.: 172,032
Filed: Aug. 16, 1971

U.S. Applications:

[63] Continuation-in-part of Ser. No. 867,331, Oct. 17, 1969, Pat. No. 3,646,780.

[30] Foreign Application Priority Data

June 30, 1971 United Kingdom ..... 30616/71

[52] U.S. Cl. ..... 112/438; 66/85 A; 66/192

[51] Int. Cl.[2] ..... D04B 23/10; D04B 21/14; D04H 1/52

[58] Field of Search ..... 112/163, 165, 197, 198, 112/121.16, 79 R, 438; 28/4 R; 66/85 A, 192

[56] References Cited

UNITED STATES PATENTS

| | | | |
|---|---|---|---|
| 2,217,967 | 10/1940 | Phillips | 112/79 R |
| 2,377,564 | 6/1945 | Lundgren | 28/4 R |
| 2,890,579 | 6/1959 | Mauersberger | 66/85 A |
| 3,010,178 | 11/1961 | Rust, Jr | 28/4 R |
| 3,365,918 | 1/1968 | Hughes | 66/85 A X |
| 3,417,580 | 12/1968 | Scholtis et al. | 66/85 A |
| 3,452,561 | 7/1969 | Stousland et al. | 66/192 |
| 3,646,780 | 3/1972 | Wildeman | 66/85 A |

FOREIGN PATENTS OR APPLICATIONS

| | | | |
|---|---|---|---|
| 1,495,184 | 8/1967 | France | 66/85 A |
| 2,007,611 | 9/1970 | Germany | 66/85 A |
| 1,091,050 | 11/1967 | United Kingdom | 66/85 A |
| 1,078,757 | 8/1967 | United Kingdom | 66/85 A |
| 878,248 | 9/1961 | United Kingdom | 66/85 A |

*Primary Examiner*—Werner H. Schroeder
*Attorney, Agent, or Firm*—Oblon, Fisher, Spivak, McClelland & Maier

[57] ABSTRACT

Apparatus for producing stitch bonded fabric and having needles which penetrate a fleece and receives threads which are controlled by thread guides and also including wires which enter but do not completely penetrate the fleece whereby a loop of fibers are formed around a hook of the needle and retained thereby. The threads lock the interengaged stitch loops and means are provided to permit a thread to be passed over the hook formation of the needle to form a [ tricot- ] stitch seam to the fleece.

8 Claims, 2 Drawing Figures

APPARATUS FOR PRODUCING STITCH BONDED FABRIC

Matter enclosed in heavy brackets [ ] appears in the original patent but forms no part of this reissue specification; matter printed in italics indicates the additions made by reissue.

*This application is a reissue of Pat. No. 3,760,607, dated Sept. 25, 1973, Ser. No. 172,032, filed Aug. 16, 1971; which is a continuation-in-part of application Ser. No. 867,331, filed Oct. 17, 1969, and now Pat. No. 3,646,780, dated Mar. 7, 1972.*

This invention relates to apparatus for producing a stitched bonded fabric in which the rows of seams running lengthwise of the stitched bonded fabric are produced by the formation of tricot stitches, the stitches being locked to the fabric by virtue of the interengagement of fiber loops from the fleece with the loops of the warp threads. The present apparatus is a modification of the apparatus described in my prior U.S. Pat. No. 3,646,780 entitled, "Apparatus and Method for Making a Stitch-Bonded Fabric," issued on Mar. 7, 1972.

Basically a stitch bonded fabric is produced by the provision, in a fleece lap, of a multitude of longitudinal rows of chain-stitch seams. This type of fabric has the disadvantage that the seams, which are produced by the use of, for example, a series of slide or tubular needles are capable of being easily pulled out from one end or from a break in the stitching yarn, since the stitch formation of each row consists essentially of a series of interengaged loops.

In the above-mentioned Patent application we have provided an apparatus for producing a stitch bonded fabric in which the stitches of each longitudinal row of seams are locked against removal by causing fibres anchored in the fleece to become interengaged with the stitch loops. The apparatus includes a series of spaced slide or tubular needles adapted to penetrate the fleece and become located in position to receive threads controlled by thread guides, there being provided wires or rods arranged to be independently and synchronously moved relative to said needles, the wires or rods being arranged to enter but not completely penetrate the fleece whereby a loop of fibres of the fleece may be formed around a hook formation on the needles to be retained thereby, in addition to the threads, to provide for the locking of interengaged stitch loops.

According to the present invention, means are provided to allow a thread from one of said thread guides to be passed over the hook formation of the needle which is next in line to the adjacent needle, whereby tricot-stitch seams can be applied to the fleece.

The invention will now be described further by way of example only, with reference to the accompanying drawings.

Figure 1:
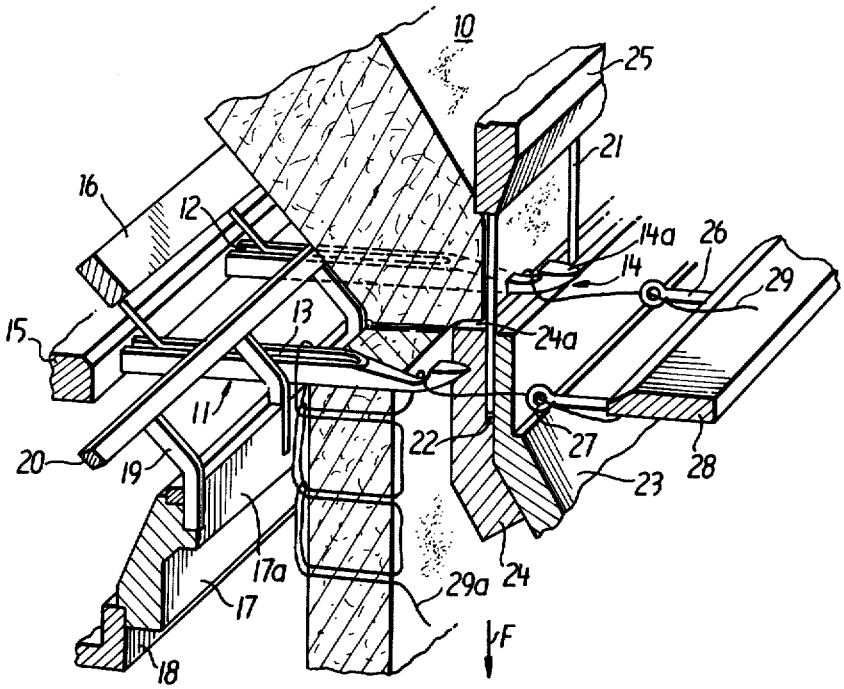

FIG. 1 is a part-sectional broken view of apparatus made in accordance with the invention described in application Ser. No. 867,331, filed Oct. 17, 1969, now issued as U.S. Pat. No. 3,646,780 on May 7, 1972.

Figure 2:
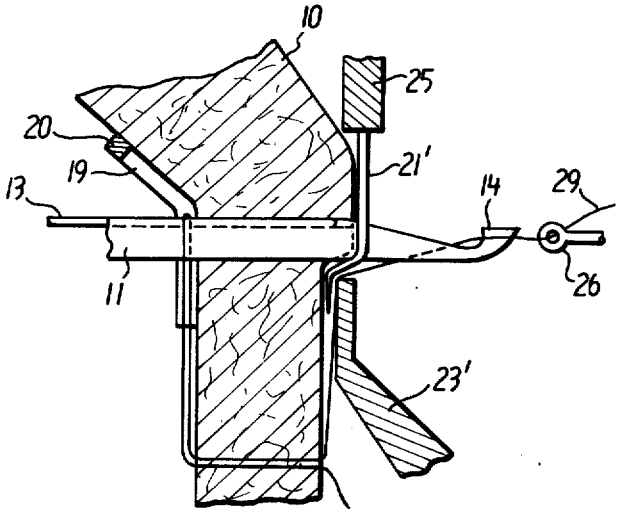

FIG. 2 is a part-sectional end elevation of a modified form of apparatus made in accordance with the present invention, parts being omitted for the sake of clarity.

Referring firstly to FIG. 1 a stitch bonded fabric is produced by passing a fleece 10 through a sewing knitting machine which incorporates a row of slide needles

11 (that is needles having on one edge a groove 12 in which a wire rod 13 can slide to open and close a hook formation 14 at the needle point). Alternatively tubular needles may be used in which a wire rod slides in or through a hole in the needle to close the hook formation.

The slide needles 11 are mounted upon a carrier bar 15 which is reciprocable towards and away from the fleece 10 to cause penetraton and retraction of the needles through the fleece.

Mounted above the carrier bar 15 and adapted to carry the wire rods 13 is a rod mounting rail 16 which is also reciproable towards and away from the fleece 10. The reciprocation of the mounting rail is controlled independently of but in timed relationship with the carrier bar 15.

It is important to note that the uppermost face 14a of the hook formation lies in the same plane as the lowermost point of the groove 12 of the needle 11 so that, when required in the cycle of operations the rods 13 can overlie the hook formations 14 to close the hook.

Mounted forwardly of the carrier bar 15 and in fixed condition is a holding member 17 conveniently secured to a part 18 of the machine frame Projecting upwardly from the holding member 17 and spaced to allow passage of the needle 11 therebetween is a series of fleece guide arms 19 connected to a tie bar 20 which extends across the working width of the machine. The tie bar 20, arms 19 and the front face 17a of the holding member 17 serve collectively as a fleece and fabric guide against which the "rear face" of the fleece and the just formed fabric passes when the machine is in operation. In addition to guiding the fleece and fabric, the fleece and fabric guide serves to retain the fleece and fabric against movement with the needles during their retraction from the fleece.

Spaced from the arms 19 are a series of support pins 21, there being a support pin in alignment with each arm 19. The support pins 21 are carried at their lower ends in a groove 22 formed by a pin retention bar 23 and a cloth retention bar 24. The two elements 23, 24 are secured together by studs or the like (not shown). Alternatively, a unitary grooved rail may be provided to replace the elements 23, 24, the pins being seated in the groove. The pins 21 at their upper ends are mounted in a beam 25 which extends across the working width of the machine. The beam 25 and pins 21 collectively form a fleece guide for the "front face" of the fleece, and the cloth retention bar 24 forms a cloth guide for the "front face" of the just formed cloth. It will be appreciated that, by virtue of the construction and disposition of the elements 20, 19 and 17 relative to the elements 25, 21 and 24, the fleece and cloth is, as it is moved in the direction of arrow F, constrained therebetween.

Spaced from the bar 23 at the side remote from the needles 11 and at the level of the needles are a series of thread guides 26 each having an eye 27 through which the threads pass. There is of course a thread guide 26 for each needle 11. The thread guides 36 are carried by a rail 28. Threads 29 are passed through the eye 27 of each thread guide 26. The rail 28 and thus the thread guides 26 are adapted to reciprocate transversely of the machine with a slight rise and fall so that a thread 29 can be laid in the hook of each needle 11.

The stitched fabric is formed by successive penetration of the fleece by the needles, the latter picking up the threads and forming a chain stitch seam *having*

*interlocking thread loops on one face of the fleece (the left side in FIGS. 1 and 2) and connecting thread legs on the other face of the fleece (the right side in FIGS. 1 and 2).*

In accordance with the invention and as shown in FIG. 2, in the modified form of the apparatus, wherein like parts are denoted by like reference numerals, the cloth retention bar has been removed and the pin retention bar 23' has been moved rearwardly to take its place.

The pins 21' are supported at their upper ends by the beam 25 and are of cranked shape as shown at their lower ends so that their free ends are located rearwardly of the bar 23', whilst maintaining their usual position above the stitching level.

In the arrangement of FIG. 1 it is necessary for each thread guide to lay the thread over the hook end of the adjacent needle 11. Any crossing over of the thread onto the next consecutive needle would cause the thread to foul the adjacent pin 21 with the result that the apparatus would become jammed.

In the arrangement of FIG. 2, however, cross-over or tricot stitch can be performed upon the fleece owing to the fact that the threads can slide down over the shaped part of the pins 21' to follow the movement of the fabric.

In order to enable the thread 29 to pass from the line of a needle 11 (FIG. 2) to a needle in an adjacent row, the thread guide 26 is moved laterally taking the thread over the top of the pin retention bar 23' and through the free space on the right hand side of the figure to the next row of needles. It is necessary for the pin 25 to be cranked to pass behind the retention bar 23'.

The forward location of the upper part of the pins 21' ensures that the "front face" of the fleece is far enough forwards to enable the hook ends of the needles 11 to gather fibres from the frontal region of the fleece, whilst the rearward location of the free ends of the pins 21' together with the pin retention bar 23' ensures that, upon each penetration of the fleece by a needle, the previous loop of thread along with the loop of gathered fibres is pushed well onto the shank of the needle and is not carried fowards by the latter to become tangled with the next loop when formed. Thus the pin retention bar 23' also serves as a cloth retention bar.

I claim:

1. An apparatus for producing a stitched bonded fabric from a fleece, said apparatus comprising a frame, a series of needles mounted in a spaced relation on said frame in a position to penetrate the fleece, a hook formation at the end of each needle, the hook formation being adapted to gather loops of fiber from the fleece upon withdrawal of the needle from the fleece, a corresponding number of thread guides mounted in the same plane as that of the needles and being reciprocally movable transversely on said frame to place threads on the hook formation at the end of each of said needles after penetrating said fleece, a rod positioned in each of said needles and being adapted to be moved partially through said fleece independently of said needles for mating engagement with said hook formations, a retention bar located below the level of the needles, and a series of support pins mounted on said frame and having their free ends cranked and positioned behind said retention bar to allow a thread on transverse movement of one of said thread guides to slide freely over the hook formation of one needle to the adjacent needle, whereby tricot stitches are formed and are locked into the fabric.

*2. An apparatus for producing a stitched bonded fabric from a fleece, said apparatus comprising a frame, a series of needles mounted in a spaced relation on said frame in a position to penetrate the fleece, a hook formation at the end of each needle, the hook formation providing means to gather loops of fiber from the fleece during withdrawal of the needle from the fleece, a corresponding number of thread guides mounted in the same plane as that of the needles and being reciprocally movable transversely on said frame to place threads on the hook formation at the end of each of said needles after penetrating said fleece, a rod positioned in each of said needles and being movable partially through said fleece independently of said needles for mating engagement with said hook formations, a retention bar located below the level of the needles, and a series of support pins mounted on said frame and having their free ends cranked and positioned behind said retention bar.*

*3. An apparatus for producing a stitched bonded fabric from a fleece, said apparatus comprising a frame, a series of needles mounted in a spaced relation on said frame in a position to penetrate the fleece, a hook formation at the end of each needle, the hook formation providing means to gather loops of fiber from the fleece during withdrawal of the needle from the fleece, a corresponding number of thread guides mounted in the same plane as that of the needles and being reciprocally movable transversely on said frame to place threads on the hook formation at the end of each of said needles after penetrating said fleece, a rod positioned in each of said needles and being movable partially through said fleece independently of said needles for mating engagement with said hook formations, a retention bar located below the level of the needles and extending along the series of needles, and a series of support pins mounted on said frame and having free ends disposed toward said retention bar.*

*4. An apparatus for producing a bonded fabric from a fleece, said apparatus comprising a frame, a series of needles mounted in a spaced relation on said frame in a position to penetrate the fleece, a hook formation at the end of each needle, the hook formation providing means to gather loops of fiber from the fleece during withdrawal of the needle from the fleece, a rod positioned in each of said needles and being movable partially through said fleece independently of said needles for mating engagement with said hook formations, a retention bar located below the level of the needles, and a series of support pins mounted on said frame and having their free ends cranked and positioned behind said retention bar.*

*5. An apparatus for producing a bonded fabric from a fleece, said apparatus comprising a frame, a series of needles mounted in a spaced relation on said frame in a position to penetrate the fleece, a hook formation at the end of each needle, the hook formation providing means to gather loops of fiber from the fleece during withdrawal of the needle from the fleece, a rod positioned in each of said needles and being movable partially through said fleece independently of said needles for mating engagement with said hook formations, a retention bar located below the level of the needles and extending along the series of needles, and a series of support pins depending from a support bar mounted on said frame above the level of the needles, said pins being disposed toward said retention bar.*

*6. A method of producing stitch bonded fabric having fleece and fibers including the steps of passing a series of*

*needles through a fleece, halting a rod or wire associated with each needle within the fleece, halting the needles after penetration of the fleece and before they have penetrated to an extent such that the greatest height of the needle has passed through the fleece, laying a thread over the hook of each needle, retracting the needles to draw the threads through the fleece in the form of loops, and simultaneously to collect by the inherent resiliency of the fleece a bundle of fibers from the region of the face of the fleece from which the needle hooks have projected, closing the hooks of the needles by said wires or rods to retain the threads and the fiber bunches in the needle hooks, retracting the needles together with said collected fibers and thread in said hooks, opening the needle hooks after retraction of the needles from the fleece, progressing the fleece in the take up direction, decreasing the thickness of*

*the fleece by tightening of the stitches and by compressing the fleece between fleece guide arms and cranked support pins, and continuously repeating the cycle begun by passing the needles through the fleece to produce lines of fiber-locked stitches of thread to produce a fabric.*

*7. A textile comprising a fleece having a plurality of loose fibers, and a system of interlocking stitches of yarn having interlocked thread loops on one face of said fleece and connecting thread legs on the other face of said fleece, said yarn being locked against removal from the fleece by entanglement of said yarn and loose fibers in said stitches.*

*8. The textile of claim 7 wherein said stitches are tricot stitches.*

* * * * *